(12) United States Patent
McCoy et al.

(10) Patent No.: US 7,388,305 B2
(45) Date of Patent: Jun. 17, 2008

(54) AC/DC CONVERTER HAVING SINGLE DETECTABLE INPUT

(75) Inventors: Bryan Wayne McCoy, Phoenix, AZ (US); Alan David Finkel, Tempe, AZ (US); William E. Davis, Scottsdale, AZ (US); Andrew Christopher Stirling, Desert Hills, AZ (US); Agus Suryana The, Mesa, AZ (US)

(73) Assignee: Mobility Electronics, Inc., Scottsdale, AZ (US)

( * ) Notice: Subject to any disclaimer, the term of this patent is extended or adjusted under 35 U.S.C. 154(b) by 171 days.

(21) Appl. No.: 11/340,371

(22) Filed: Jan. 26, 2006

(65) Prior Publication Data

US 2007/0170785 A1 Jul. 26, 2007

(51) Int. Cl.
*H01H 35/00* (2006.01)
*H01H 47/00* (2006.01)
*H01H 83/00* (2006.01)
*H02B 1/24* (2006.01)
*H02H 3/00* (2006.01)

(52) U.S. Cl. ..................................................... 307/130
(58) Field of Classification Search ................. 307/130
See application file for complete search history.

(56) References Cited

U.S. PATENT DOCUMENTS

| | | | |
|---|---|---|---|
| 3,873,846 A | 3/1975 | Morio et al. | |
| 3,889,173 A | 6/1975 | Klusmann et al. | |
| 3,898,474 A | 8/1975 | Funatsu et al | |
| 4,092,709 A | 5/1978 | Voigt et al. | |
| 4,890,217 A | 12/1989 | Conway | |
| 5,245,220 A | 9/1993 | Lee | |
| 5,847,545 A * | 12/1998 | Chen et al. | 320/138 |
| 7,061,225 B2 * | 6/2006 | Yang et al. | 324/103 P |
| 7,224,086 B2 * | 5/2007 | Germagian et al. | 307/128 |

FOREIGN PATENT DOCUMENTS

| | | |
|---|---|---|
| EP | 1 111 764 A2 | 6/2001 |
| EP | 1 372 254 A2 | 12/2003 |
| WO | WO03/038979 | 5/2003 |
| WO | WO2005/124982 | 12/2005 |

* cited by examiner

*Primary Examiner*—Michael J Sherry
*Assistant Examiner*—Carlos Amaya
(74) *Attorney, Agent, or Firm*—Jackson Walker LLP; Robert C. Klinger

(57) ABSTRACT

An AC/DC input power converter including only a single input cable such that a user will never have to switch cabling, regardless if the cable is connected to an AC voltage source or a DC voltage source.

6 Claims, 3 Drawing Sheets

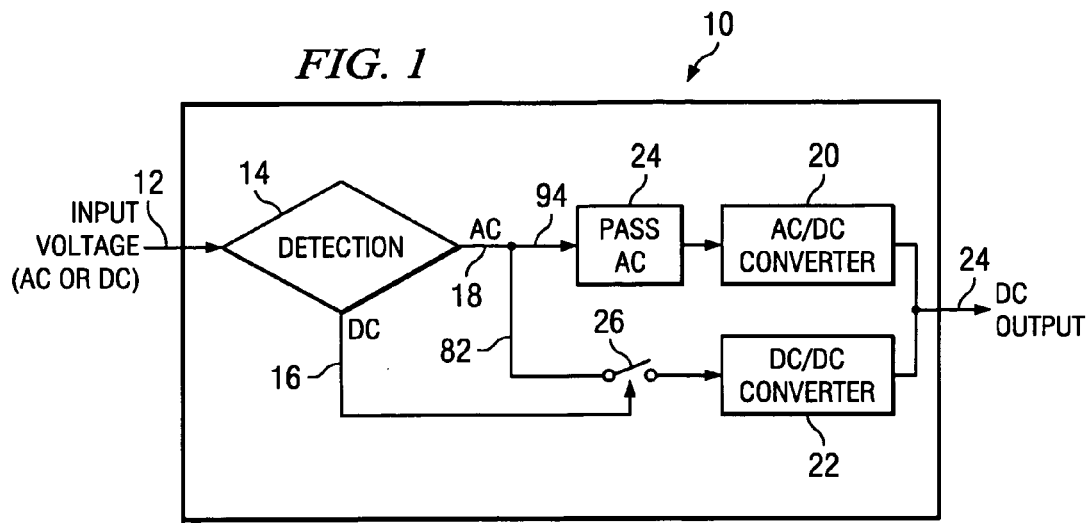
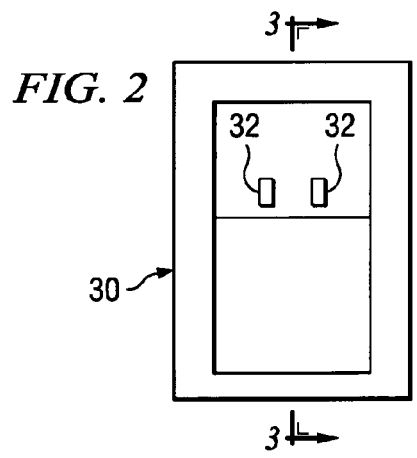
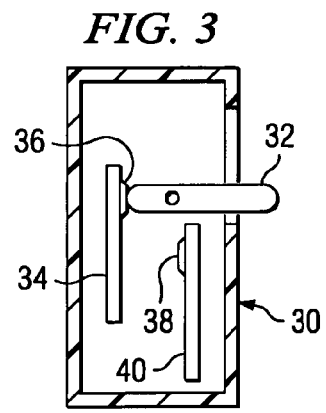
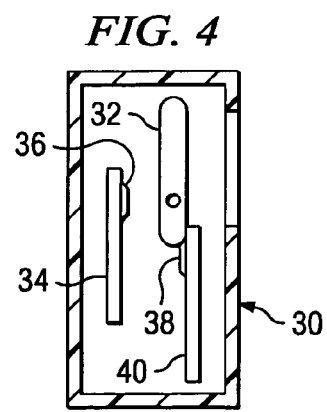

AC/DC CONVERTER HAVING SINGLE DETECTABLE INPUT

FIELD OF THE INVENTION

The present invention is generally related to power converters, and more particularly to AC/DC input power converters adapted to power portable electronic devices.

BACKGROUND OF THE INVENTION

Power converters that are adapted to receive both an AC input voltage and a DC input voltage typically require two different input cables. Thus, the power converter user is required to carry both power cables with them as they transition from home to car, and from car to aircraft. The AC cable and DC cable may be removable so that the user can unplug an AC cable and plug in a DC cable, and vice versa. Since the cables are removable, they can be easily lost and the user is forced to replace them.

One prior solution is an AC/DC input power converter having a Y connection permanently attached to the input of the converter, with one leg of the Y connection adapted to receive a DC input voltage, and the other leg adapted to receive an AC input voltage. However, when the AC/DC voltage input is connected in a Y configuration, the user is still forced to manage both cables regardless of which one is in use. Thus, the manufacturer is also forced to incur the same costs as producing two individual cables.

An AC/DC input power converter is desired that utilizes only a single input cable, eliminating the need to manage multiple cables which also facilitating the transition from one environment to another.

SUMMARY OF INVENTION

The present invention achieves technical advantages over a standard AC/DC input power converter because it utilizes only a single input power cable so that a user will never have to switch cabling, regardless of the cabling connection AC voltage or DC voltage source.

The invention comprises multiple embodiments of switching and/or detecting an AC input voltage or a DC input voltage to determine which voltage is present, such that the converter is responsively configured to process which ever voltage source is present and provide a converted voltage. The detection of the AC input voltage and/or the DC input voltage is preferably automatic so that the user simply has to connect the single input cable to the desired power source.

BRIEF DESCRIPTION OF THE DRAWINGS

FIG. 1 is a block diagram of one preferred embodiment of the present invention;

FIG. 2 depicts a front view of one embodiment of an AC/DC power converter connector having retractable AC prongs;

FIG. 3 is a side sectional view of the embodiment shown in FIG. 2 depicting the AC prongs in the extended position and making contact with a proximate AC electrode;

FIG. 4 is a side sectional view depicting the AC prongs in the retracted position making contact with a proximate DC electrode;

DETAILED DESCRIPTION OF THE PRESENT INVENTION

Figure 5:
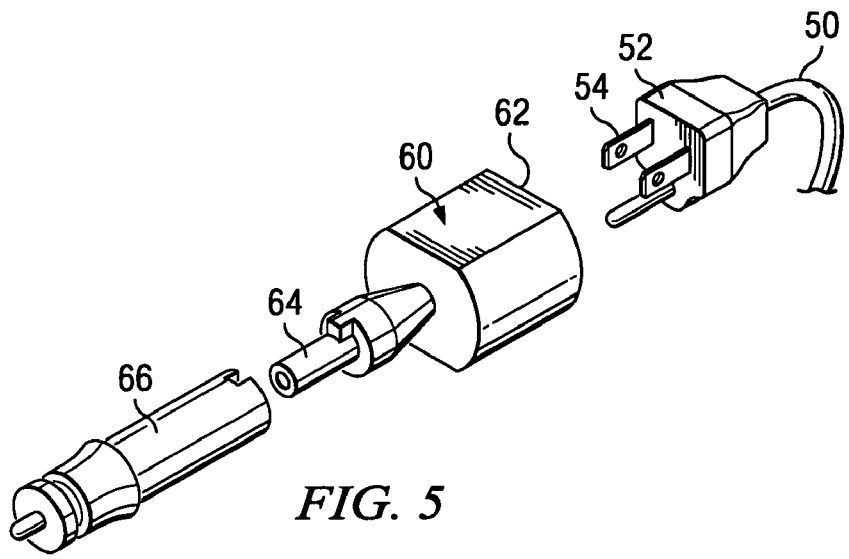
FIG. 5 is an enhanced perspective view of a power converter cable and plug, and a plug adapter configured to couple a DC input voltage from an auto or aircraft to the plug.

Referring now to FIG. 1, there is generally shown at 10 a block diagram of a AC/DC input power converter according to a first preferred embodiment of the present invention. Power converter 10 is seen to include a single input 12 configured to receive either an AC input voltage source or a DC input voltage source and which voltage type is detectable by detection circuit 14. Detection circuit 14 is configured to detect if the input voltage provided to input 12 is an AC input voltage or a DC input voltage, and responsively generate a control signal 16 controlling the processing of the presented voltage. The input voltage signal is passed to line 18 and processed by either AC/DC converter 20 or the DC/DC converter 22. The processed voltage is provided by the respective converter 20 and 22 to an output 24, preferably comprising a DC voltage. However, it is within the scope of the present invention that the output voltage provided to output 24 may also be an AC voltage if desired, whereby the respective converters would comprise of an AC/AC converter and a DC/AC converter. Hence, limitation to the type of output voltage at output 24 is not to be inferred.

Still referring to FIG. 1, this embodiment includes an AC filter circuit 24 configured to pass only an AC voltage to the AC/DC converter 20. Hence, when the DC voltage is provided to line 18, this DC voltage will not pass to AC/DC converter 20. Detection circuit 14, upon detecting a DC input voltage at line 12, will responsively enable the DC/DC converter 22 such that the DC voltage on line 18 is presented to this DC/DC converter 22, such as via a switch 26 selectively controlled by the control signal 16. There are many types of switches 26 that may be utilized, such as mechanical switches, relays, solid state switches including transistors, and combinations thereof. Hence, the type of switch 26 utilized is a matter of design choice and is chosen based on multiple design parameters.

With further reference to detection circuit 14, several embodiments will now be discussed.

Referring to FIG. 2, there is shown a front view of an AC plug 30 having AC prongs 32 configured to plug into a standard AC outlet to receive an AC voltage therefrom, such as 120 volts. Prongs 32 may be adapted to receive the AC input voltage from a wall power source, and provide this AC voltage to input 12 of power converter 10.

Referring now to FIG. 3, there is shown a side sectional view of the plug 30 further depicting the displaceable prongs 32, in this embodiment configured as pivotable prongs 32 that can pivot between an extended position as shown in FIG. 3, and a retracted position as shown in FIG. 4. In the extended position, the prongs 32 are configured to electrically connect with an electrical contact 36, such as an electrical contact provided on a printed circuit board including other circuitry and coupled to the detector 14. In the retracted position, the prongs 32 are retracted such that they make electrical contact with electrical contact 38 of a printed circuit board 40 including additional circuitry, as shown. Thus, displaceable prongs 32 form a portion of one embodiment of switch 26. Advantageously, when the prongs 32 are in the fully retracted position, as shown in FIG. 4, prongs 32 form a closed circuit configured to pass a DC voltage via the prongs between the detector 14 and the DC/DC converter 22, as shown in FIG. 1.

Referring now to FIG. 5, there is shown an enhanced perspective view of another embodiment of the present invention whereby an input power cable (cord) 50 comprising a portion of converter 10 is configured to receive and conduct either an AC voltage or DC voltage to input 12 of converter 10. Cable 50 is seen to include a connector 52 at a distal end thereof, shown as a plug including respective electrical contacts 54, shown in this embodiment as prongs configured to plug into as standard 120 volt AC outlet such as is standard in the United States. An adaptor 60 includes a receptacle 62 which is configured to receive the electrical contacts 54 of connector 52, and having another connector 64 configured to detachably connect to a standard DC power source, such as that provided by an aircraft, or that provided by a vehicle such as an automobile, boat, truck, and so forth. In this embodiment, an aircraft adaptor 64 is seen to be electrically coupled to adaptor 60 and having a distal end configured to electrically connect to a mating connector on an aircraft. A DC plug 66 is also shown that is adapted to electrically couple at one end to the aircraft adaptor 64, and having a distal end configured to be received in a standard vehicle cigarette lighter socket. Of course, according to other embodiments of the present invention, both the adaptors 64 and 66 may be configured to separately electrically connect to adaptor 60 and provide DC power directly thereto for electrically coupling to contacts 54, and the serial implementation depicted in FIG. 5 is only one embodiment of the present invention.

Figure 6:
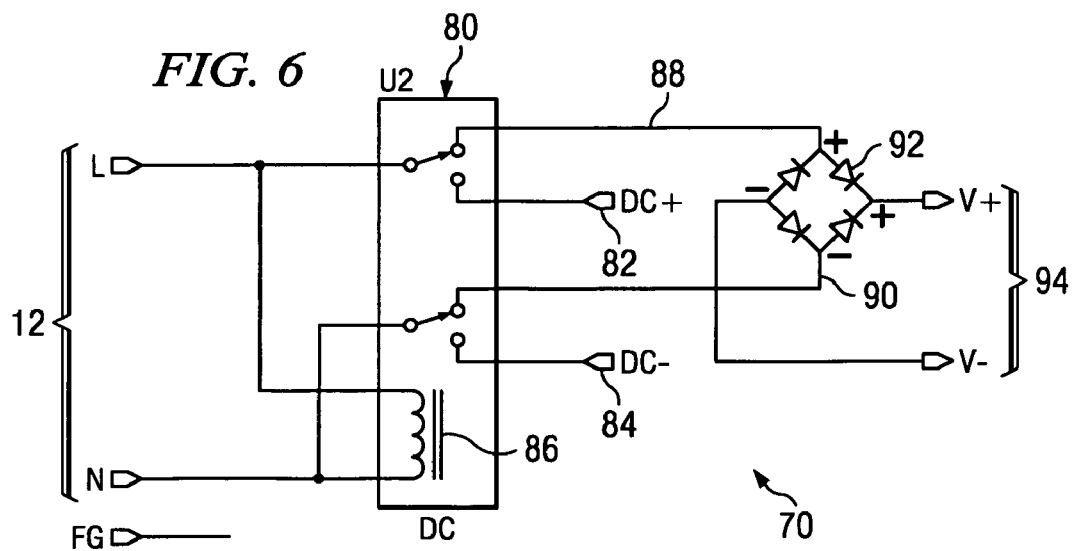
FIG. 6 is an electrical schematic view of another preferred embodiment of the present invention configured to automatically detect the presence of a DC input voltage.

Referring now to FIG. 6, there is depicted at 70 an electrical circuit comprising another embodiment of the present invention configured to electrically detect the presence of an AC voltage provided to the converter input 12. In this embodiment, an AC voltage provided to input 12 is passed via a relay 80 to conductors 88 and 90, which feed a full-wave rectifier 92. The full-wave rectified AC voltage from rectifier 92 is provided to AC lines 94, as shown.

Conversely, when a DC voltage is provided to input 12, the DC voltage is provided to a coil 86 forming a portion of relay 80, thereby causing the relay contacts to close. The closed contacts provide the DC voltage from input 12 to DC conductors 82 and 84, with the positive conductor shown at 82, and the ground being 84. Hence, relay 80 serves as a detector 14 configured to pass the input voltage at input 12 to conductors 90 and 92 when an AC input voltage is detected, and to conductors 82 and 84 when a DC voltage is detected. The embodiment in FIG. 6 is highly resistant to temperature fluctuations and minimizes detector part counts.

Figure 7:
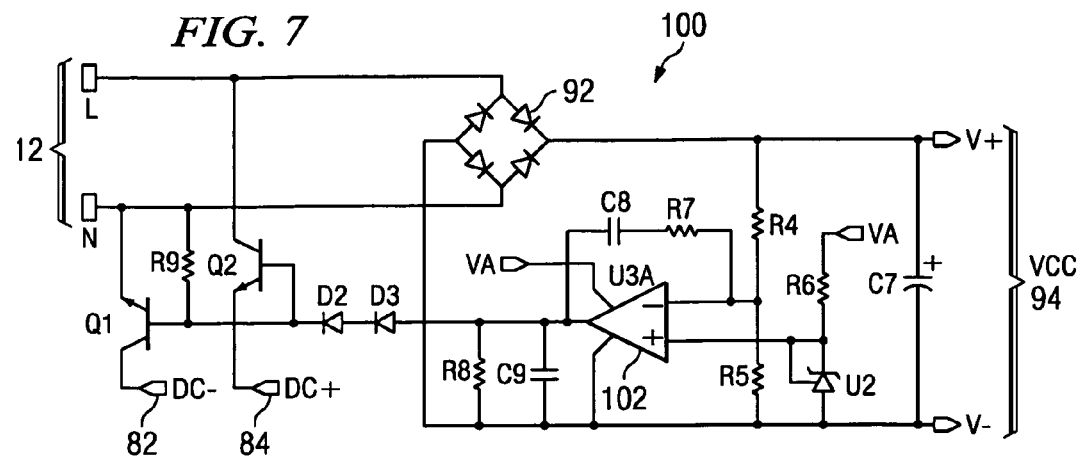
FIG. 7 is an electrical schematic diagram of another preferred embodiment configured to detect the presence of a DC input voltage.

Referring now to FIG. 7, there is shown another preferred embodiment of detector 14 as circuit 100. Circuit 100 is seen to include a pair of semiconductor transistors Q1 and Q2 coupled to respective lines of input 12 and the DC conductors 82 and 84, as shown. The controls of these transistors Q1 and Q2 are coupled to each other and to the output of an integrator 102 configured to change state upon a DC voltage being coupled via the full wave rectifier 92 to the non-inverting input thereof, seen as pin 2. Advantageously, integrator 102 changes state upon detecting a DC voltage provided across its inverting and non-inverting inputs such that a high output enables both transistors Q1 and Q2, such that transistors Q1 and Q2 respectively couple the DC voltage at input 12 to respective DC conductors 82 and 84. The embodiment of FIG. 7 is also highly resistant to temperature fluctuations.

Figure 8:
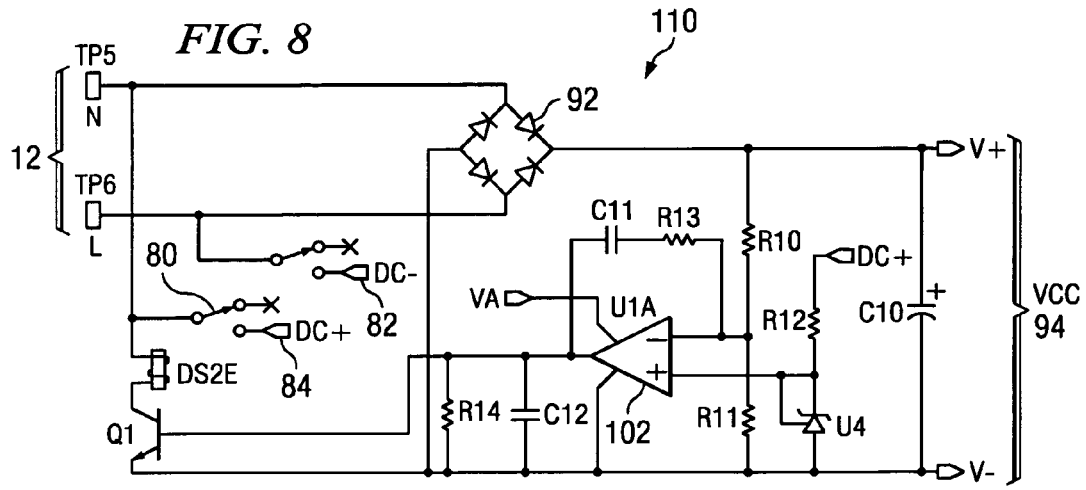
FIG. 8 is an electrical schematic diagram of yet another preferred embodiment configured to detect the presence of a DC input voltage.

Referring now to FIG. 8, there is shown another embodiment of detector 14 shown as circuit 110 including the combination of the integrator 102 and the relay 80. In this embodiment, the output of integrator 102 controls transistor Q1. Enabling transistor Q1 completes the circuit through the relay coil, thereby closing the relays to connect input 12 to respective conductors 82 and 84 as previously discussed. Integrator 102 changes state only upon detection of a DC voltage across its input. When an AC voltage is provided to integrator 102, the output remains low and thus transistor Q1 remains off. Hence, relay 80 remains open and isolates the AC voltage at input 12 from DC conductors 82 and 84.

Figure 9:
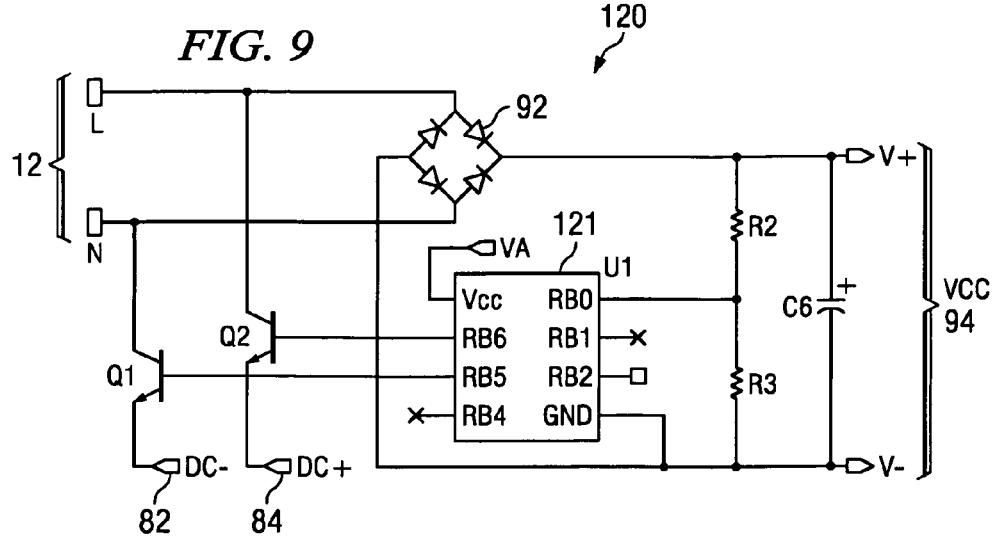
FIG. 9 is an electrical schematic diagram of yet another preferred embodiment configured to detect the presence of a DC input voltage.

Referring now to FIG. 9, there is shown another embodiment of detector 14 shown as circuit 120 including the combination of a microprocessor 121 and a pair of transistors. In this embodiment, the output of microprocessor 121 controls transistors Q1 and Q2. Enabling transistors Q1 and Q2 completes the circuit to connect input 12 to respective conductors 82 and 84 as previously discussed. Microprocessor 121 changes state if a fundamental frequency less than 20 Hz is detected through the resistor divider R2 and R3. When an AC frequency is provided to microprocessor 121, the output remains low and thus transistors Q1 and Q2 remain off, hence, isolating the AC voltage at input 12 from DC conductors 82 and 84.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A power converter, comprising:
   an input;
   a DC/DC converter configured to receive a DC input voltage from the input and provide a first DC voltage to an output;
   a AC/DC converter configured to receive an AC input voltage from the input and provide a second DC voltage to the output;
   a detector configured to detect whether the AC input voltage or the DC input voltage is provided to the input and responsively enable or disable either the DC/DC converter or the AC/DC converter; and
   wherein the detector comprises a circuit including an integrator configured to enable or disable either the DC/DC converter or the AC/DC converter upon detection of the DC input voltage.

2. The power converter as specified in claim 1 wherein the detector comprises a solid state switch configured to detect the DC input voltage.

3. The power converter as specified in claim 1 further comprising a relay configured to pass the DC input voltage as a function of the integrator.

4. The power converter as specified in claim 1 wherein the displaceable prongs are configured to be rotatable between a first position and a second position.

5. The power converter as specified in claim 1 wherein the detector is configured to selectively control the DC/DC converter as a function of the prongs' position.

6. A power converter, comprising:
an input;
a DC/DC converter configured to receive a DC input voltage from the input and provide a first DC voltage to an output;
a AC/DC converter configured to receive an AC input voltage from the input and provide a second DC voltage to the output;
a detector configured to detect whether the AC input voltage or the DC input voltage is provided to the input and responsively enable or disable either the DC/DC converter or the AC/DC converter; and
wherein the power converter further comprises displaceable prongs configured to receive the AC input voltage and which are electrically coupled to the AC/DC converter, wherein the detector is configured to respond to a position of the displaceable prongs.

* * * * *